E. F. MELLINGER.
KETTLE LID.
APPLICATION FILED OCT. 20, 1916.
1,305,825.
Patented June 3, 1919.
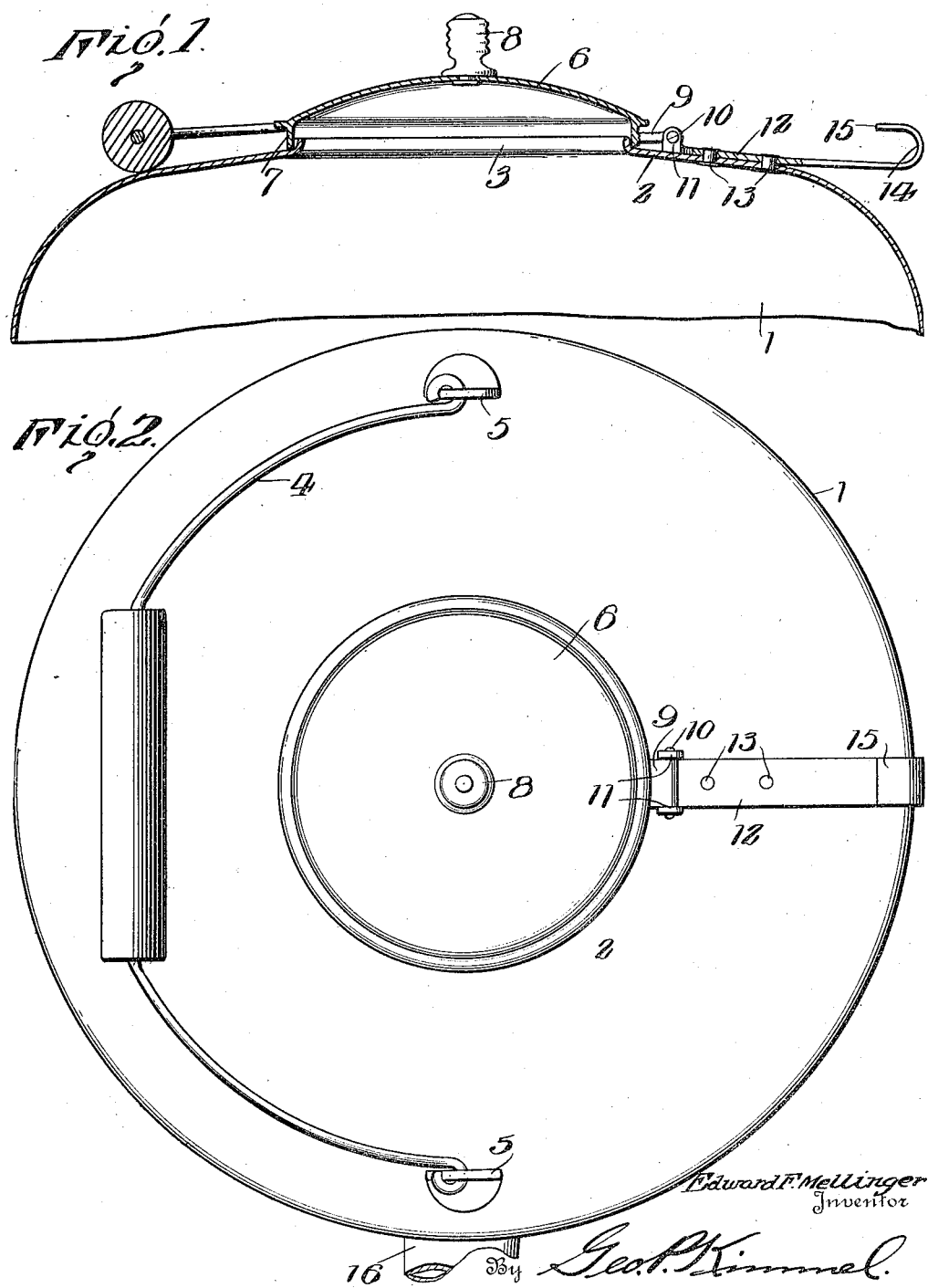

UNITED STATES PATENT OFFICE.

EDWARD F. MELLINGER, OF CANTON, OHIO.

KETTLE-LID.

1,305,825.  Specification of Letters Patent.  Patented June 3, 1919.

Application filed October 20, 1916. Serial No. 126,727.

*To all whom it may concern:*

Be it known that I, EDWARD F. MELLINGER, a citizen of the United States, and resident of Canton, in the county of Stark and State of Ohio, have invented certain new and useful Improvements in Kettle-Lids, of which the following is a specification.

The present invention relates to cooking utensils and has particular reference to new and useful improvements in hinged kettle lids.

An object of my invention is to provide a lid of the class described having novel hinging means associated therewith for mounting the same upon a kettle or the like, means being provided upon which the lid may rest when in open position.

Another object of my invention is to provide a hinged lid of the class described which may be attached to any of the existing types of kettles without materially altering the structure of the same.

Other objects and advantages to be derived from the use of my improved kettle hinge and lid will appear from the following detailed description and the claim, taken with an inspection of the accompanying drawing, in which:

Figure 1 is a transverse sectional view of a kettle embodying the improvements of my invention; and Fig. 2 is a top plan view of the same.

Referring more particularly to the drawing, wherein similar characters of reference designate like and corresponding parts throughout the various views, 1 designates the body of a kettle having the usual inwardly directed flange 2 forming a top, the same being formed with an opening 3.

The kettle is provided with the usual bail 4 pivotally mounted in the ears 5. I provide a lid designated 6 having an annular flange 7 to rest upon the top 2 about the opening 3, said lid having a knob or handle 8 thereon. An arm 9 extends from a point on said flange 7, said arm being pivotally connected at 10 between lugs 11, said lugs being carried by a strip 12 riveted or otherwise connected at 13 to the top 2. The outer free end of the strip 12 is bent upon itself as at 14 to form a resting portion 15 for the handle 8.

When applied as shown it will be noted that the lid may be moved to open position, the handle 8 thereof resting upon the portion 15 of the strip 12. The arrangement of the strip as shown provides means for supporting the lid when in open position and for preventing contact of the same with the body of the kettle which tends to overheat the handle and prevent manipulation of the lid. The spout of the kettle is designated 16 and, as will be apparent from Fig. 2, is arranged at right-angles to the strip 12 so that if it is desired to pour the contents of the kettle through the spout the lid will remain in the position to which the same has been moved and not fall off the kettle as often occurs.

From the above description taken in connection with the accompanying drawing, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:

In a device of the character described, in combination, a kettle having a filling opening in its top, a strip of metal having one end portion secured to the top of the kettle in proximity to the opening, upstanding apertured lugs formed on opposite sides of the inner extremity of the strip, a lid for closing the opening in the kettle swingably mounted between the lugs, a knob on the lid, the remaining portion of the metal strip extending outwardly therefrom and in a horizontal direction and the extreme free end portion of the strip being folded upwardly and inwardly upon itself to form a rest for the knob when the lid is in an open position.

In testimony whereof, I affix my signature hereto.

EDWARD F. MELLINGER.

Copies of this patent may be obtained for five cents each, by addressing the "Commissioner of Patents, Washington, D. C."